(12) United States Patent
Uchida

(10) Patent No.: US 11,508,282 B2
(45) Date of Patent: Nov. 22, 2022

(54) DISPLAY CONTROL DEVICE, DISPLAY CONTROL METHOD, AND NON-TRANSITORY RECORDING MEDIUM

(71) Applicant: Casio Computer Co., Ltd., Tokyo (JP)

(72) Inventor: Shuhei Uchida, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 17/169,167

(22) Filed: Feb. 5, 2021

(65) Prior Publication Data

US 2021/0248947 A1 Aug. 12, 2021

(30) Foreign Application Priority Data

Feb. 10, 2020 (JP) .............................. JP2020-020289

(51) Int. Cl.
*G09G 3/20* (2006.01)
*G09G 3/04* (2006.01)
(Continued)

(52) U.S. Cl.
CPC .............. *G09G 3/2003* (2013.01); *G09G 3/04* (2013.01); *G09G 2300/023* (2013.01);
(Continued)

(58) Field of Classification Search
CPC ......... H04W 52/0254; H04W 52/0258; H04W 52/028; G09G 2300/023; G09G 2330/021; G09G 2330/022; G09G 2330/023; G09G 2360/06; G09G 2370/00; G09G 3/04; G09G 3/20; G09G 3/2003; G06F 1/163; G06F 1/1684; G06F 1/1694; G06F 1/3218; G06F 1/3231; G06F 1/3265; G06F 1/3287; G06F 1/3293; H04B 1/385; H04M 1/725
See application file for complete search history.

(56) References Cited

U.S. PATENT DOCUMENTS

| | | | |
|---|---|---|---|
| 2007/0079161 A1* | 4/2007 | Gupta | G06F 1/3293 713/324 |
| 2014/0075226 A1* | 3/2014 | Heo | G06F 3/167 713/323 |

(Continued)

FOREIGN PATENT DOCUMENTS

| | | |
|---|---|---|
| JP | H02-206866 A | 8/1990 |
| JP | H06-187197 A | 7/1994 |

(Continued)

OTHER PUBLICATIONS

Japanese Office Action, dated Mar. 1, 2022, for Japanese Application No. 2020-020289. (4 pages). (with English translation).

*Primary Examiner* — Kenneth Bukowski
(74) *Attorney, Agent, or Firm* — Seed IP Law Group LLP (57) ABSTRACT

A display control device includes a first display capable of color display, a first controller performing reset control of the first display, and a second controller having less throughput than the first controller. The first controller executes reset control on the first display in a case of a first operation mode in which the first controller is active. The second controller executes reset control on the first display in a case of a second operation mode in which the first controller is inactive or in a case of detection of the first controller not operating normally.

9 Claims, 7 Drawing Sheets

(51) Int. Cl.
*H04M 1/725* (2021.01)
*H04B 1/3827* (2015.01)

(52) U.S. Cl.
CPC . *G09G 2330/022* (2013.01); *G09G 2330/023* (2013.01); *G09G 2360/06* (2013.01); *G09G 2370/00* (2013.01); *H04B 1/385* (2013.01); *H04M 1/725* (2013.01)

(56) References Cited

U.S. PATENT DOCUMENTS

| | | | | |
|---|---|---|---|---|
| 2016/0063664 | A1* | 3/2016 | Mizuno | G06T 1/20 |
| | | | | 345/502 |
| 2019/0004595 | A1* | 1/2019 | Mizuno | G06F 3/14 |
| 2020/0183634 | A1* | 6/2020 | Kruse | G08G 1/095 |
| 2022/0004244 | A1* | 1/2022 | Park | G06F 3/0488 |

FOREIGN PATENT DOCUMENTS

| | | | |
|---|---|---|---|
| JP | 2009-031595 | A | 2/2009 |
| JP | 2009031595 | * | 2/2009 |
| JP | 2015-135347 | A | 7/2015 |
| JP | 2016-053621 | A | 4/2016 |
| JP | 2017-116621 | A | 6/2017 |

* cited by examiner

| OPERATION MODE | MAIN MICRO-PROCESSOR | SUB-MICRO-PROCESSOR | FIRST DISPLAY | SECOND DISPLAY | POWER CONSUMPTION |
|---|---|---|---|---|---|
| M1 | Active | Active | Active | Off | HIGH → LOW |
| M2 | Sleep | Active | Active | Off | |
| M3 | Sleep | Active | Off | Active | |
| M4 | Sleep⇔Active | Off | Active | Off | |
| M5 | Off | Active | Active | Off | |
| M6 | Off | Active | Off | Active | |

DISPLAY CONTROL DEVICE, DISPLAY CONTROL METHOD, AND NON-TRANSITORY RECORDING MEDIUM

CROSS-REFERENCE TO RELATED APPLICATION

This application is based upon and claims the benefit of priority under 35 USC 119 of Japanese Patent Application No. 2020-020289 filed on Feb. 10, 2020, the entire disclosure of which, including the description, claims, drawings, and abstract, is incorporated herein by reference in its entirety.

FIELD

This application relates generally to a display control device, a display control method, and a non-transitory recording medium.

BACKGROUND

While productization of wearable and portable electronic equipment such as a wrist terminal and a smartphone is progressing in recent years, electronic equipment including a display panel supporting two-layered display for segment display and color display has been commercialized. For example, in a technology disclosed in Unexamined Japanese Patent Application Publication No. 2016-53621 being a Japanese patent literature, two central processing units (CPUs), one being a main microprocessor and the other being a sub-microprocessor with less throughput but less power consumption than the main microprocessor are equipped on wearable or portable electronic equipment, and a display panel for segment display and a display panel for color display are controlled by respective CPUs.

SUMMARY

A display according to a preferred embodiment includes:
a first display;
a first processor configured to perform reset control of the first display; and
a second processor configured to perform reset control of the first display and having throughput less than the first processor,
wherein the first processor among the first processor and the second processor executes reset control of the first display in a case of a first operation mode in which the first processor is active, and
the second processor among the first processor and the second processor executes reset control of the first display (i) in a case of a second operation mode in which the first processor is inactive or (ii) in a case of detection of the first processor not operating normally.

BRIEF DESCRIPTION OF THE DRAWINGS

A more complete understanding of this application can be obtained when the following detailed description is considered in conjunction with the following drawings, in which.

DETAILED DESCRIPTION

An embodiment of the present disclosure will be described in detail below with reference to drawings. Note that the same or equivalent parts are given the same sign in the drawings.

Figure 1:
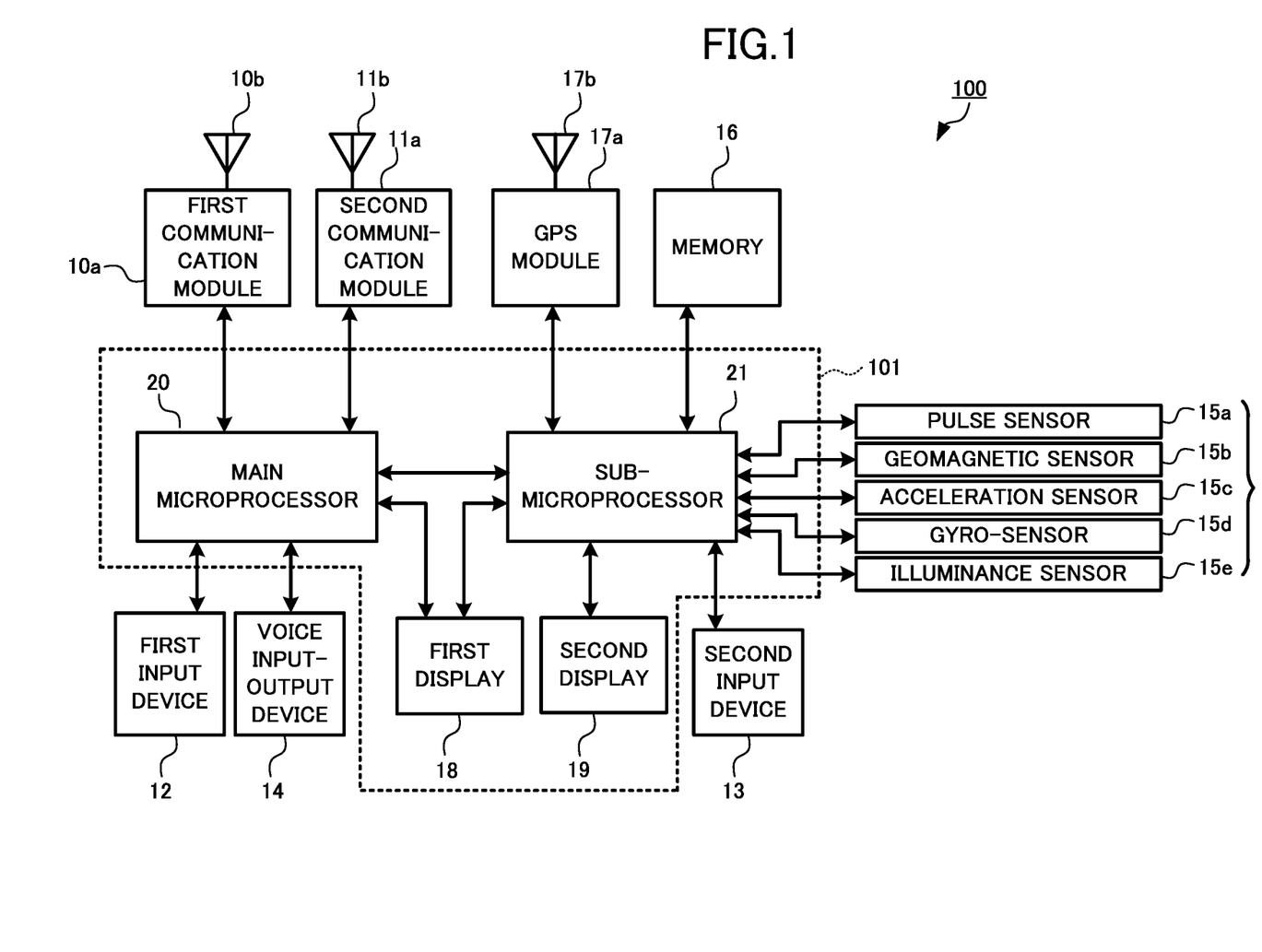
FIG. 1 is a block diagram illustrating a configuration of electronic equipment according to an embodiment of the present disclosure.

Electronic equipment 100 according to the embodiment of the present disclosure is wearable or portable equipment such as a wrist terminal or a smartphone. The equipment will be hereinafter particularly described as a wearable wrist terminal. As illustrated in FIG. 1, the electronic equipment 100 includes a first communication module 10a and an antenna 10b, and a second communication module 11a and an antenna 11b that are for transmitting and receiving data to and from the outside. The electronic equipment 100 further includes a first input device 12 and a second input device 13 that receive input from a user and a voice input-output device 14 for inputting a voice from a user and outputting a voice to the user. The electronic equipment 100 further includes a sensor 15 for detecting a usage state and the like of the electronic equipment 100, a memory 16 saving programs and various types of data, and a GPS module 17a and a GPS antenna 17b for acquiring information from a Global Positioning System (GPS) satellite. The electronic equipment 100 further includes a first display 18 capable of performing color display and a second display 19 performing display more simplified than the first display 18. The electronic equipment 100 further includes a main microprocessor 20 and a sub-microprocessor 21 performing various types of processing by executing a program saved in the memory 16. For example, the sub-microprocessor 21 has less throughput but less power consumption than the main microprocessor 20.

The first communication module 10a and the antenna 10b constitute a communication module capable of wirelessly connecting to and communicating with portable terminals such as a smartphone and a tablet. For example, the communication module can be configured with a communication module and an antenna that support Bluetooth (registered trademark). The second communication module 11a and the antenna 11b constitute a communication module capable of wirelessly connecting to various access points. For example, the communication module can be configured with a communication module and an antenna that support a wireless local area network (WLAN).

Each of the first input device 12 and the second input device 13 is an input device receiving input from a user. For example, the input device can be configured with a touch panel, a key button, and the like. The voice input-output device 14 is a piece of voice input-output equipment capable of inputting a voice from a user to the electronic equipment 100 and outputting a voice from the electronic equipment 100 to the user. For example, the input-output device can be configured with a microphone, a speaker, and the like.

The sensor 15 is a sensor capable of detecting a usage state and the like of the electronic equipment 100 by a user. The sensor 15 includes a pulse sensor 15a detecting a pulse of the user, a geomagnetic sensor 15b detecting geomagnetism of a location where the electronic equipment 100 resides, an acceleration sensor 15c and a gyro-sensor 15d that detect a motion, an inclination, and the like of the electronic equipment 100, and an illuminance sensor 15e detecting an amount of light at the location where the electronic equipment 100 resides.

The memory 16 is a storage in which a program for controlling an operation of the electronic equipment 100, various types of information to be displayed on the first display 18 and the second display 19, to be described later, and the like are saved. The memory 16 can be configured with a read only memory (ROM), a storage element, and the like. The GPS module 17a and the GPS antenna 17b can acquire information about the present position of the electronic equipment 100 from a GPS satellite.

The first display 18 is a display panel capable of performing color display. The first display 18 can be configured with a display panel capable of color display such as an organic electro-luminescence (EL) display, a liquid crystal display (LCD), or a display panel capable of displaying maximum intensity projection (MIP).

The second display 19 is a display panel for performing display more simplified and less power consuming than display on the first display 18. For example, the simplified and low power consuming display includes monochrome display and segment display using numerals, symbols, and the like. The second display 19 can be configured with a display panel such as an organic EL display, an LCD, or a display panel capable of MIP display.

It is assumed in the present embodiment that either of the first display 18 and the second display 19 is configured with a transmissive display panel, and the transmissive display panel and a non-transmissive display panel are flatwise stacked in this order. It is assumed in this case that the non-transmissive display panel also serves as backlight of the transmissive display panel. Both the first display 18 and the second display 19 may be configured with transmissive display panels. It is assumed in this case that the first display 18 and the second display 19 are flatwise stacked, and a light source for backlight is provided on the back most side.

The main microprocessor 20 is connected to the first communication module 10a, the second communication module 11a, the first input device 12, the voice input-output device 14, the first display 18, and the sub-microprocessor 21. By acquiring a program saved in the memory 16 through the sub-microprocessor 21 and executing the program, the main microprocessor 20 performs various types of processing such as connection processing with the outside by the first communication module 10a and the second communication module 11a, and display processing by the first display 18 based on an input from the first input device 12. The main microprocessor 20 can be configured with a control component such as a CPU and a micro-processing unit (MPU). Further, the main microprocessor 20 may include a random access memory (RAM) into which the program acquired from the memory 16 is read. The main microprocessor 20 is an example of a first processor in the claims.

The sub-microprocessor 21 is connected to the second input device 13, the sensor 15, the memory 16, the GPS module 17a and the antenna 17b, the first display 18, the second display 19, and the main microprocessor 20. The sub-microprocessor 21 is further connected to an unillustrated counter circuit capable of performing counting with time information, any timing, or the like as a trigger, and an unillustrated remaining battery power measuring instrument measuring remaining battery power.

The sub-microprocessor 21 is configured with a microprocessor with less throughput but less power consumption than the main microprocessor 20. By acquiring a program saved in the memory 16 and executing the program, the sub-microprocessor 21 performs various types of processing such as display processing of the second display 19 based on an input from the second input device 13 and display processing of the first display 18 in a low power mode in which the main microprocessor 20 is shut down. The sub-microprocessor 21 can be configured with a control component such as a CPU or an MPU. Further, the sub-microprocessor 21 may include a RAM into which the program acquired from the memory 16 is read. The sub-microprocessor 21 is an example of a second processor in the claims.

The first display 18, the second display 19, the main microprocessor 20, and the sub-microprocessor 21 are collectively referred to as a display control block 101 in the present embodiment. The display control block 101 is an example of a display control device in the claims.

A configuration of the display control block 101 will be described below referring to FIG. 2. The main microprocessor 20 is connected to the sub-microprocessor 21 through a first connection interface 201. The first connection interface 201 is an interface for transmitting and receiving various control signals between the main microprocessor 20 and the sub-microprocessor 21. Each of the main microprocessor 20 and the sub-microprocessor 21 can detect a state of the other processor, such as whether the processor is under normal operation, from a communication state in the first connection interface 201. The first connection interface 201 can be configured with an interface for relatively low-speed data communication such as a serial interface such as a serial peripheral interface (SPI) or a parallel interface.

The main microprocessor 20 is connected to the first display 18 through a first display control interface 202 and a second display control interface 203. The first display control interface 202 is an interface transmitting predetermined signals including image data generated by the main microprocessor 20 to the first display 18. Image data generated by the main microprocessor 20 may be either type of full-color image data and monochrome image data. For example, the first display control interface 202 can be configured with an interface conforming to a standard for a relatively high data transfer rate, such as a serial interface such as a mobile industry processor interface (MIPI) or a parallel interface. The second display control interface 203 is an interface for periodically notifying a state of the first display 18 to the main microprocessor 20. For example, the second display control interface 203 can be configured by use of a synchronous interface such as a synchronization profile (SYNC).

The sub-microprocessor 211 is connected to the first display 18 and the second display 19 through a third display control interface 204. The third display control interface 204 is an interface transmitting predetermined signals including image data generated by the sub-microprocessor 21 to the first display 18 and the second display 19. Image data generated by the sub-microprocessor 21 are image data with a less pixel count than image data generated by the main microprocessor 20. The third display control interface 204 can be configured with an interface for relatively low-speed data communication, such as a serial interface such as an SPI or a parallel interface.

The sub-microprocessor 21 is further connected to the first display through a fourth display control interface 205. The fourth display control interface 205 is an interface for periodically notifying a state of the first display 18 to the sub-microprocessor 21. For example, the fourth display control interface 205 can be configured by use of a synchronous interface such as SYNC.

The main microprocessor 20 and the sub-microprocessor 21 are connected to the first display 18 by a reset signal interface 206 through an OR circuit 23. The OR circuit 23 is a circuit for branching the connection between the first display 18, and the main microprocessor 20 and the sub-microprocessor 21. The configuration allows the first display 18 to be connected to the main microprocessor 20 and allows a reset control signal from the main microprocessor 20 to be transmitted to the first display 18, while first display 18 is controlled by the main microprocessor 20. The reset control herein refers to determining whether to execute reset processing and executing the reset processing, based on the determination result.

Further, while the first display 18 is controlled by the sub-microprocessor 21, the first display 18 can be connected to the sub-microprocessor 21, and a reset control signal from the sub-microprocessor 21 can be transmitted to the first display 18. Reset of the first display 18 previously executable only from the sub-microprocessor 21 can be thereby executed from the main microprocessor 20. The reset signal interface 206 can be configured with a serial interface such as SPI, a parallel interface, or the like. While not being illustrated in FIG. 2, it is assumed that reset control of the second display 19 is performed by the sub-microprocessor 21.

Further, the main microprocessor 20 and the sub-microprocessor 21 are connected to an integrated power supply device 22 through a first power control interface 207 and a second power control interface 208, respectively. The integrated power supply device 22 is a power supply device including a plurality of power supply devices and a power controller for controlling power supply from each power supply device. For example, the integrated power supply device 22 includes a first power supply device 221, a second power supply device 222, and a third power supply device 223. The first power supply device 221 is used as a power source for the first display 18, the second power supply device 222 is used as a power source for the second display 19, and the third power supply device 223 is used as a power source for the sensor 15. For example, the integrated power supply device 22 can be configured with a plurality of power supply devices and a power management integrated circuit (PMIC) performing power control.

The first power control interface 207 is an interface capable of individually setting whether to output voltage to each of the first power supply device 221 to the third power supply device 223 included in the integrated power supply device 22. For example, the first power control interface 207 can be configured with an Enable interface capable of transmitting, to each power supply device, High and Low signals output from the main microprocessor 20. For example, the power controller in the integrated power supply device 22 controls each power supply device in such a way as to output voltage when a signal output from the main microprocessor 20 through the first power control interface 207 is High and controls the power supply device in such a way as not to output voltage when the signal output from the main microprocessor 20 is Low.

The second power control interface 208 is an interface capable of collectively controlling whether to output voltage to the first power supply device 221 to the third power supply device 223 included in the integrated power supply device 22. Further, the second power control interface 208 can also set whether to output voltage to each of the first power supply device 221 to the third power supply device 223. For example, the second power control interface 208 can be configured with a coaxial interface including a plurality of channels. Control of voltage supply to the first display 18 previously executable only from the sub-microprocessor 21 can be thereby executed from the main microprocessor 20.

By switching an operating state of each of the main microprocessor 20, the sub-microprocessor 21, the first display 18, and the second display 19, the electronic equipment 100 according to the present embodiment can set a plurality of operation modes. For example, each operation mode is achieved by interruption or suppression of voltage supply to the main microprocessor 20, the sub-microprocessor 21, the first display 18, and the second display 19.

Figure 3:
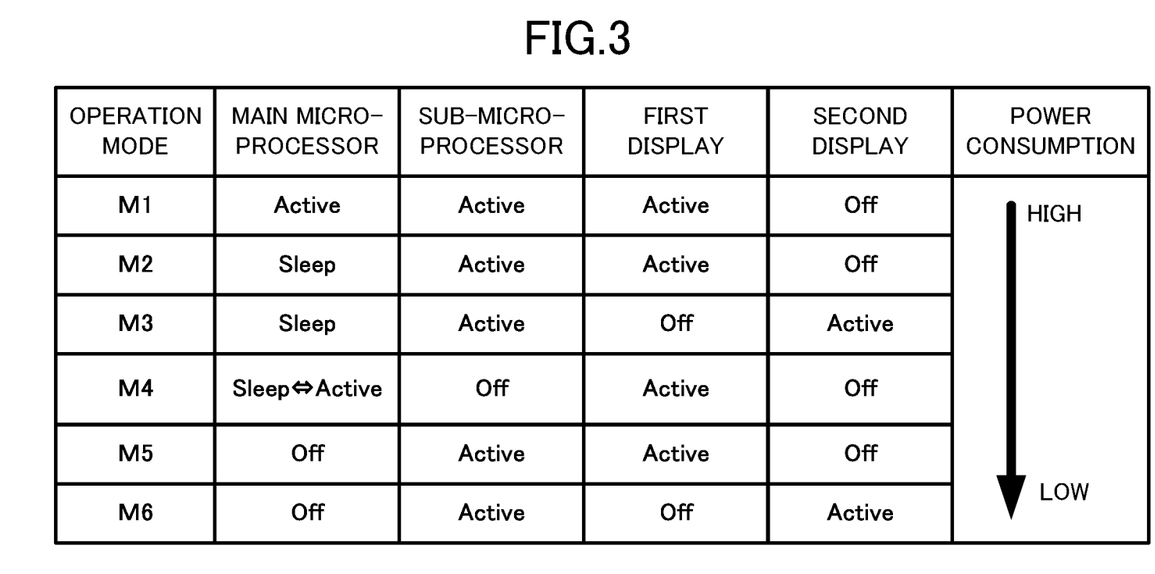
FIG. 3 is a diagram describing each operation mode of the electronic equipment according to the embodiment of the present disclosure.

For example, FIG. 3 describes operation modes M1 to M6 as an example of operation modes of the electronic equipment 100. In the operation mode M1, the main microprocessor 20, the sub-microprocessor 21, and the first display 18 are in an Active state or a state in which voltage is supplied and the component is in operation, and the second display 19 is in an Off state or a state in which voltage supply is interrupted and the component is not in operation. In the electronic equipment 100, control of the first display 18 is performed by the main microprocessor 20 when the main microprocessor 20 is in the Active state.

Next, in the operation mode M2, the main microprocessor 20 is in a Sleep state or a standby state in which voltage supply is suppressed, the sub-microprocessor 21 and the first display 18 are in the Active state, and the second display 19 is in the Off state. In this case, the main microprocessor 20 is in the standby state and therefore does not control the first display 18. The control of the first display 18 is performed by the sub-microprocessor 21.

In the operation mode M3, the main microprocessor 20 is in the Sleep state, the sub-microprocessor 21 and the second display 19 are in the Active state, and the first display 18 is in the Off state. In this case, the sub-microprocessor 21 controls the second display 19. In the operation mode M4, the state of the main microprocessor 20 is switched between the Sleep state and the Active state, the sub-microprocessor 21 and the second display 19 are in the Off state, and the first display 18 is in the Active state. For example, the switching between the Sleep state and the Active state in the main microprocessor 20 refers to shifting from the Sleep state to the Active state when a predetermined event occurs and shifting from the Active state to the Sleep state when processing of the event ends. In this case, the main microprocessor 20 controls the first display 18 in the Active state and does not control the first display 18 in the Sleep state.

In the operation mode M5, the main microprocessor 20 and the second display 19 are in the Off state, and the sub-microprocessor 21 and the first display 18 are in the Active state. In this case, the main microprocessor 20 is in the Off state and therefore does not control the first display 18. The control of the first display 18 is performed by the sub-microprocessor 21. Further, in the operation mode M6, the main microprocessor 20 and the first display 18 are in the Off state, and the sub-microprocessor 21 and the second display 19 are in the Active state. In this case, the sub-microprocessor 21 controls the second display 19.

Previously, control of voltage to the first display 18 and the second display 19 is performed by the sub-microprocessor 21, and therefore an operation mode for interrupting voltage to the sub-microprocessor 21 cannot be provided in the electronic equipment 100. However, according to the present embodiment, control of the integrated power supply device 22 illustrated in FIG. 2 can be executed from both the main microprocessor 20 and the sub-microprocessor 21. Therefore, a new operation mode being an operation mode for interrupting voltage to the sub-microprocessor 21, such as the operation mode M4 described in FIG. 3, can be provided in the electronic equipment 100.

A case in which each of the aforementioned main microprocessor 20, sub-microprocessor 21, first display 18, and second display 19 is in the Active state is an example of a case of being active in the claims. Further, a case in which each of the aforementioned main microprocessor 20, sub-microprocessor 21, first display 18, and second display 19 is in the Off state is an example of a case of being inactive in the claims.

Power consumption in each of the operation modes M1 to M6 decreases in an order of M1 to M6. It is assumed in the present embodiment that the sub-microprocessor 21 is configured with a microprocessor less power consuming than the main microprocessor 20, and the second display 19 is configured with a display panel less power consuming than the first display 18, as illustrated in FIG. 1. Therefore, the operation mode in which the main microprocessor 20 and the first display 18 are in the Active state has greater power consumption than the other operation modes. Further, the operation mode in which the sub-microprocessor 21 and the second display 19 are in the Active state, and the main microprocessor 20 and the first display 18 are in the Off state has less power consumption than the other operation modes.

Figure 4A:
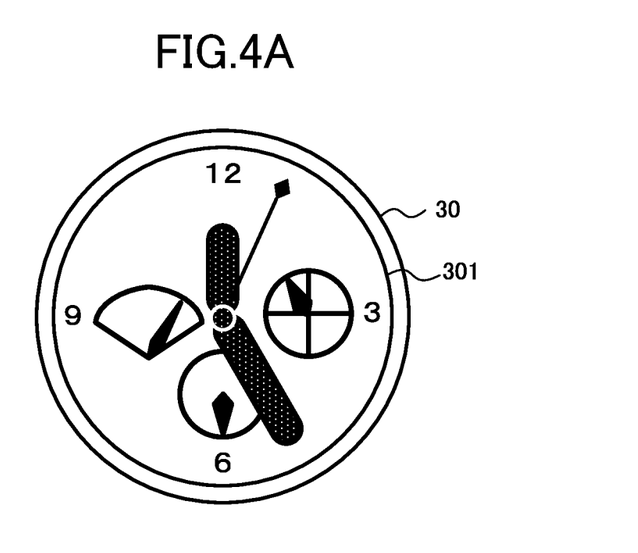
FIG. 4A is a diagram illustrating an example of a display on a display panel according to the embodiment of the present disclosure and is an example of a display on a display panel for color display, the display being controlled by a main microprocessor.
Figure 4B:
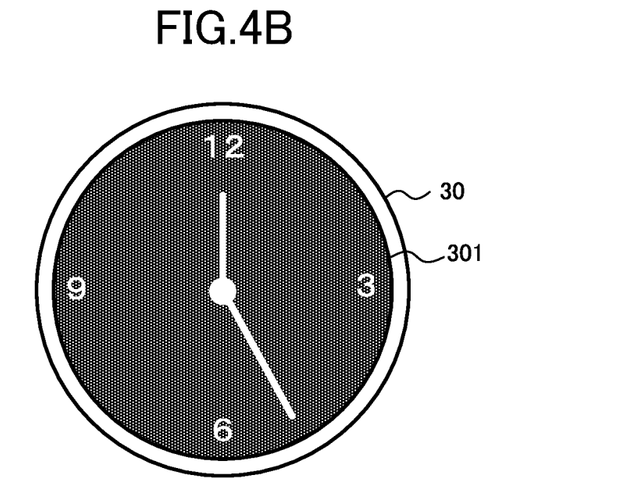
FIG. 4B is a diagram illustrating an example of a display on the display panel according to the embodiment of the present disclosure and is an example of a display on the display panel for color display, the display being controlled by a sub-microprocessor.
Figure 4C:
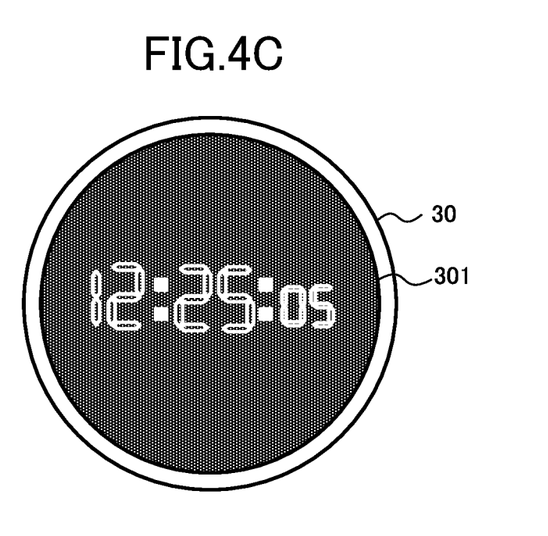
FIG. 4C is a diagram illustrating an example of a display on the display panel according to the embodiment of the present disclosure and is an example of a display on a display panel for segment display, the display being controlled by the sub-microprocessor.

The electronic equipment 100 according to the present embodiment is a wrist terminal as described above. FIG. 4A to FIG. 4C illustrate examples of displays on the first display 18 and the second display 19 in the operation modes M1 to M6 described in FIG. 3 when the electronic equipment 100 functions as a watch. FIG. 4A is an example of a display on the first display 18 controlled by the main microprocessor 20. FIG. 4B is an example of a display on the first display 18 controlled by the sub-microprocessor 21. FIG. 4C is an example of a display on the second display 19 controlled by the sub-microprocessor 21. The first display 18 and the second display 19 are hereinafter generically referred to as a display 30.

For example, as illustrated in FIG. 4A, the short hand, the long hand, and the second hand of the watch and numerals indicating hours and minutes such as 12 and 3 are displayed on a screen 301 of the display 30. Further, functions of a chronograph such as a barometer and a stopwatch are displayed behind the short hand, the long hand, and the second hand of the watch. In addition to the functions of a chronograph, various images such as an animation image and a photograph may be displayed. The display on the screen 301 is an example of a display on the first display 18 controlled by the main microprocessor 20 illustrated in FIG. 2 and is, for example, a display in the operation mode M1 described in FIG. 3.

For example, as illustrated in FIG. 4B, the short hand and the long hand of the watch and numerals indicating hours and minutes such as 12 and 3 are displayed on the screen 301 of the display 30. Further, the back of the short hand and the long hand of the watch is in a single color or black, that is, a state of backlight being turned off. The sub-microprocessor 21 is configured with a microprocessor with lower throughput than the main microprocessor 20. Therefore, an image with a relatively low data volume, that is, a less color count and a less pixel count than the display on the screen 301 illustrated in FIG. 4A, or an image with a less number of updates and less changes of a screen display than the display on the screen 301 illustrated in FIG. 4A is displayed on the screen 301. For example, the display on the screen 301 is a display in the operation mode M2 and M5 described in FIG. 3.

For example, in the operation mode M4 described in FIG. 3, the main microprocessor 20 is in the Active state only when an event occurs and otherwise is in the Sleep state. In this case, for example, the main microprocessor 20 may be in the Active state only when the long hand and the short hand of the watch move and otherwise be in the Sleep state. Therefore, the screen example illustrated in FIG. 4B may be displayed in the operation mode M4.

As illustrated in FIG. 4C, hours, minutes, and seconds by segment display are displayed on the screen 301 of the display 30. Further, the back of the display of hours, minutes, and seconds is in a single color or black, that is, a state of the backlight being turned off. The second display 19 is a display panel for performing display more simplified and less power consuming than display on the first display 18, such as segment display using numerals, symbols, and the like. Therefore, hours, minutes, and seconds by segment display are displayed on the screen 301. For example, the display on the screen 301 in FIG. 4C is a display in the operation mode M3 and M6 described in FIG. 3.

A mode for controlling the first display 18 by the main microprocessor 20, that is, a mode corresponding to the operation mode M1 described in FIG. 3 is hereinafter referred to as a normal operation mode. Further, a mode for interrupting power supply to the main microprocessor 20 and controlling the first display 18 by the sub-microprocessor 21, that is, a mode corresponding to the operation mode M5 described in FIG. 3 is referred to as a low power mode. The normal operation mode is an example of a first operation mode in the claims, and the low power mode is an example of a second operation mode in the claims. Further, the operation mode M6 described in FIG. 3 is an example of a third operation mode in the claims.

For example, switching from the normal operation mode to the low power mode is made when an operation from a user is not detected for a fixed time or more after a display relating to the operation mode M1 is displayed on the display 30 illustrated in FIG. 4A or when a user gives an instruction to change the operation mode through the first input device 12 illustrated in FIG. 1. Further, for example, switching from the low power mode to the normal operation mode is made when a user gives an instruction to change the operation mode through the second input device 13 illustrated in FIG. 1 or when predetermined data are acquired by the sensor 15 illustrated in FIG. 1.

Next, display control processing performed in the display control block 101 illustrated in FIG. 2 will be described below referring to flowcharts in FIG. 5A and FIG. 5B. Each processing operation described in the flowchart of the display control processing is saved in the memory 16 illustrated in FIG. 1 as a display control processing program. When the operation mode of the electronic equipment 100 becomes the operation mode M1 described in FIG. 3, that is, the normal operation mode for controlling the first display 18 by the main microprocessor 20, the main microprocessor 20 and the sub-microprocessor 21 acquire the display control processing program saved in the memory 16, read the program into an unillustrated RAM, and execute the program. Further, while the operation mode of the electronic equipment 100 is the normal operation mode, the main microprocessor 20 and the sub-microprocessor 21 acquire the display control processing program saved in the memory 16 at fixed periods, read the program into the unillustrated RAM, and execute the program.

Figure 5A:
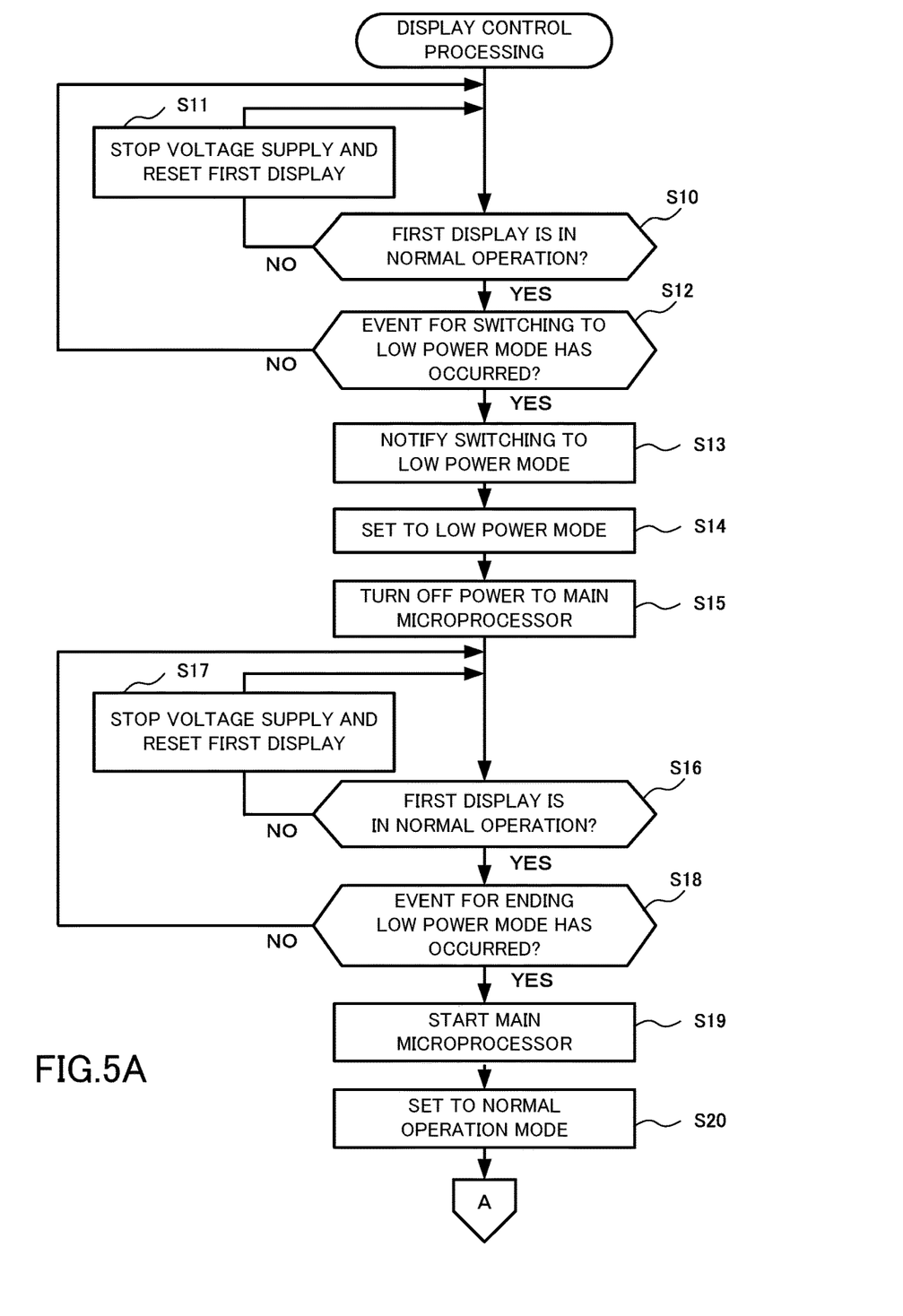
FIG. 5A is a flowchart illustrating a flow of display control processing of a display executed in the display control block in the electronic equipment according to the embodiment of the present disclosure.

First, FIG. 5A will be referred to. The main microprocessor 20 determines whether the first display 18 is in normal operation (Step S10). Specifically, the main microprocessor 20 determines whether a signal notified from the first display 18 through the second display control interface 203 illustrated in FIG. 2 is a signal indicating normal operation. When determining that the signal notified from the first display 18 is not a signal indicating normal operation (Step S10: NO), the main microprocessor 20 causes the first power supply device 221 in the integrated power supply device 22 illustrated in FIG. 2 to stop voltage supply to the first display 18. Next, the main microprocessor 20 transmits a reset control signal to the first display 18 through the OR circuit 23 and the reset signal interface 206 (Step S11). The main microprocessor 20 returns to the processing in Step S10.

When determining that the signal notified from the first display 18 is a signal indicating normal operation (Step S10: YES), the main microprocessor 20 determines whether an event for switching to the low power mode has occurred (Step S12). For example, an event for switching to the low power mode occurs when an operation from a user is not detected for a fixed time or more after a display relating to the operation mode M1 is displayed on the display 30 illustrated in FIG. 4A or when a user gives an instruction to change the operation mode through the first input device 12 illustrated in FIG. 1. When determining that an event for switching to the low power mode has not occurred (Step S12: NO), the main microprocessor 20 returns to the processing in Step S10. When determining that an event for switching to the low power mode has occurred (Step S12: YES), the main microprocessor 20 notifies switching to the low power mode to the sub-microprocessor 21 (Step S13).

Figure 2:
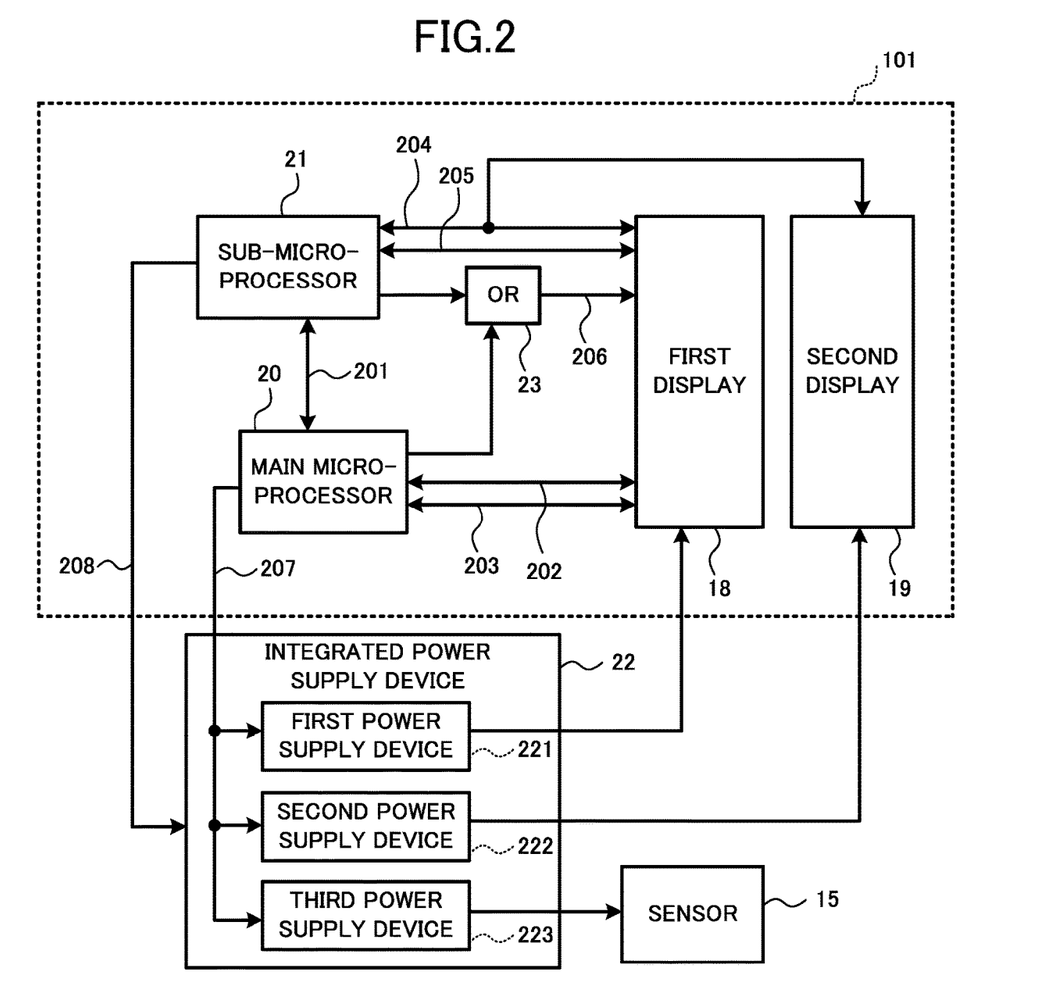
FIG. 2 is a block diagram illustrating a configuration of a display control block in the electronic equipment according to the embodiment of the present disclosure.

The sub-microprocessor 21 sets the first display 18 and the integrated power supply device 22 illustrated in FIG. 2 to the low power mode (Step S14). Specifically, the sub-microprocessor 21 transmits generated image data to the first display 18 through the third display control interface 204 illustrated in FIG. 2 and causes the first display 18 to change the display. For example, the sub-microprocessor 21 causes the first display 18 to switch from display of the screen 301 illustrated in FIG. 4A displayed in the normal operation mode to display of the screen 301 illustrated in FIG. 4B displayed in the low power mode. Next, the sub-microprocessor 21 acquires setting data for voltage supply in the low power mode from the memory 16 illustrated in FIG. 1 and sets whether to output voltage, to each of the first power supply device 221 to the third power supply device 223 in the integrated power supply device 22 through the second power control interface 208 illustrated in FIG. 2.

When ending the setting to the low power mode, the sub-microprocessor 21 notifies a control signal for turning off the power to the main microprocessor 20 through the first connection interface 201 illustrated in FIG. 2. When receiving the control signal for turning off the power, the main microprocessor 20 turns off the power to the main microprocessor 20 (Step S15).

The sub-microprocessor 21 determines whether the first display 18 is in normal operation (Step S16). Specifically, the sub-microprocessor 21 determines whether a signal notified from the first display 18 through the fourth display control interface 205 illustrated in FIG. 2 is a signal indicating normal operation. When determining that the signal notified from the first display 18 is not a signal indicating normal operation (Step S16: NO), the sub-microprocessor 21 causes the first power supply device 221 in the integrated power supply device 22 illustrated in FIG. 2 to stop voltage supply to the first display 18. Next, the sub-microprocessor 21 transmits a reset control signal to the first display 18 through the OR circuit 23 and the reset signal interface 206 (Step S17). The sub-microprocessor 21 returns to the processing in Step S16.

When determining that the signal notified from the first display 18 is a signal indicating normal operation (Step S16: YES), the sub-microprocessor 21 determines whether an event for ending the low power mode has occurred (Step S18). For example, an event for ending the low power mode occurs when a user gives an instruction to change the operation mode through the second input device 13 illustrated in FIG. 1 or when predetermined data are acquired by the sensor 15 illustrated in FIG. 1. When determining that an event for ending the low power mode has not occurred (Step S18: NO), the sub-microprocessor 21 returns to the processing in Step S16. When determining that an event for ending the low power mode has occurred (Step S18: YES), the sub-microprocessor 21 applies voltage to the main microprocessor 20 and causes the main microprocessor 20 to start (Step S19).

The main microprocessor 20 sets the first display 18 and the integrated power supply device 22 illustrated in FIG. 2 to the normal operation mode (Step S20). Specifically, the main microprocessor 20 transmits generated image data to the first display 18 through the first display control interface 202 illustrated in FIG. 2 and causes the first display 18 to change the display. For example, the main microprocessor 20 causes the first display 18 to switch from display of the screen 301 illustrated in FIG. 4B displayed in the low power mode to display of the screen 301 illustrated in FIG. 4A displayed in the normal operation mode. Next, the main microprocessor 20 acquires setting data for voltage supply in the normal operation mode from the memory 16 illustrated in FIG. 1. The main microprocessor 20 sets whether to output voltage, to each of the first power supply device 221 to the third power supply device 223 in the integrated power supply device 22 through the first power control interface 207 illustrated in FIG. 2.

Figure 5B:
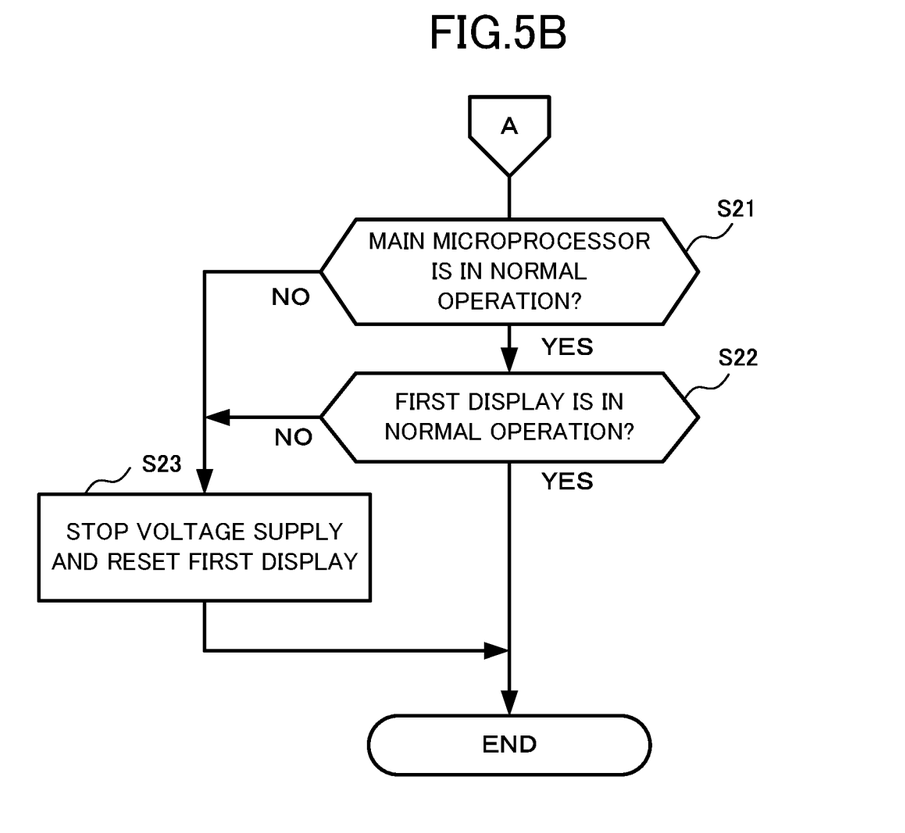
FIG. 5B is a flowchart continued from the flowchart illustrating the flow of the display control processing illustrated in FIG. 5A.

Next, FIG. 5B will be referred to. The sub-microprocessor 21 determines whether the main microprocessor 20 is in normal operation (Step S21). Specifically, the sub-microprocessor 21 detects whether the main microprocessor 20 is in normal operation from a communication state in the first connection interface 201. When determining that the main microprocessor 20 is in normal operation (Step S21: YES), the sub-microprocessor 21 determines whether the first display 18 is in normal operation (Step S22). Specifically, the sub-microprocessor 21 determines whether a signal notified from the first display 18 through the fourth display control interface 205 illustrated in FIG. 2 is a signal indicating normal operation. When determining that the signal notified from the first display 18 is a signal indicating normal operation (Step S22: YES), the sub-microprocessor 21 ends the display control processing. Next, the main microprocessor 20 also ends the display control processing.

When determining from the communication state in the first connection interface 201, in Step S21, that the main microprocessor 20 is not in normal operation and is, for example, malfunctioning or in a runaway state (Step S21: NO) or when determining, in Step S22, that the signal notified from the first display 18 is not a signal indicating normal operation (Step S22: NO), the sub-microprocessor 21 causes the first power supply device 221 in the integrated power supply device 22 illustrated in FIG. 2 to stop voltage supply to the first display 18. Next, the sub-microprocessor 21 transmits a reset control signal to the first display 18 through the OR circuit 23 and the reset signal interface 206 (Step S23). Subsequently, the sub-microprocessor 21 ends the display control processing. Next, the main microprocessor 20 also ends the display control processing.

As described above, the display control block 101 according to the present embodiment can perform reset control on the first display 18 being a display panel for color display regardless of the operation mode of the electronic equipment 100 by enabling reset control on the first display 18 from both the main microprocessor 20 and the sub-microprocessor 21. Therefore a malfunction occurring in the first display 18 can be suitably and promptly cleared.

Further, voltage supply from the integrated power supply device 22 can be controlled from both the main microprocessor 20 and the sub-microprocessor 21 in the display control block 101 according to the present embodiment. Therefore, an operation mode for turning off the power to the sub-microprocessor 21, which is not previously executable, can be set. Accordingly, a new operation mode not previously existent can be provided for a user.

Modified Example

The present disclosure is not limited to the aforementioned embodiment, and it is apparent that various modifications can be made within the spirit and scope of the present disclosure.

It is assumed in the aforementioned embodiment that the second power supply device in the integrated power supply device 22 supplies power to the second display 19. Without being limited to the above, another power supply device other than the integrated power supply device 22 may be connected and be controlled from the main microprocessor 20 and the sub-microprocessor 21.

Further, it is assumed in the aforementioned embodiment that the first input device 12 for the main microprocessor 20 and the second input device 13 for the sub-microprocessor 21 are provided as input means receiving an operation from a user, as illustrated in FIG. 1. Without being limited to the above, the input means may be input means common to the main microprocessor 20 and the sub-microprocessor 21.

It is assumed in the aforementioned embodiment that the sensor 15 is connected to the sub-microprocessor 21, as illustrated in FIG. 1. Without being limited to the above, part of the sensor 15 may be connected to the main microprocessor 20. Further, the types of sensors included in the sensor 15 may not be limited to the pulse sensor 15a detecting a pulse of a user, the geomagnetic sensor 15b detecting geomagnetism of a location where the electronic equipment 100 resides, the acceleration sensor 15c and the gyro-sensor 15d detecting a motion, an inclination, and the like of the electronic equipment 100, and the illuminance sensor 15e detecting an amount of light at the location where the electronic equipment 100 resides, and another sensor may be included.

The memory 16 according to the aforementioned embodiment is placed outside the sub-microprocessor 21, as illustrated in FIG. 1. Without being limited to the above, the memory 16 may be built into the sub-microprocessor 21.

Further, the display control processing program according to the present embodiment may be applied by any method. For example, the display control processing program may be stored into a non-transitory computer-readable storage medium such as a flexible disk, a compact disc (CD)-ROM, a digital versatile disc (DVD)-ROM, or a memory card and be applied. Furthermore, the display control processing program may be superposed on a carrier wave and be applied through a communication medium such as the Internet. For example, the program may be posted on a bulletin board system (BBS) on a communication network and be delivered. Then, the display control processing program may be started, and by executing the program similarly to another application program under control of an operating system (OS), the processing described above may be executed.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A display control device comprising:
a first display;
a first processor configured to perform reset control of the first display; and
a second processor configured to perform reset control of the first display and having throughput less than the first processor, wherein
the first processor among the first processor and the second processor executes reset control of the first display in a case of a first operation mode in which the first processor is active, and
the second processor among the first processor and the second processor executes reset control of the first display (i) in a case of a second operation mode in which the first processor is inactive or (ii) in a case of detection of the first processor not operating normally, wherein:
when an operation from an input device is not detected for a fixed time or more in the first operation mode, the first processor instructs the second processor to switch from the first operation mode to the second operation mode and subsequently switches a state of the first processor from active to inactive, and
when an instruction to switch an operation mode is given by the input device after being switched to the second operation mode, the second processor changes the first processor from inactive to active, and the first processor performs control of switching from the second operation mode to the first operation mode.

2. The display control device according to claim 1, wherein the first display displays image data generated by the first processor in a case of the first operation mode, and
the first display displays image data being generated by the second processor and having a less color count or a less pixel count than image data generated by the first processor when the first operation mode is switched to the second operation mode.

3. The display control device according to claim 1, further comprising:
a second display performing display with less power consumption than the first display, wherein the second processor executes reset control of the second display in a case of a third operation mode in which the first processor and the first display are inactive.

4. The display control device according to claim 1, wherein the first display performs color display.

5. A display control method executed in a display control device including a display, a first processor controlling the display, and a second processor controlling the display and having throughput less than the first processor, the display control method comprising:
controlling reset of the display by the first processor in a case of a first operation mode in which the first processor is active; and
controlling reset of the display by the second processor (i) in a case of a second operation mode in which the first processor is inactive or (ii) in a case of detection of the first processor not operating normally,
wherein:
when an operation from an input device is not detected for a fixed time or more in the first operation mode, the first processor instructs the second processor to switch from the first operation mode to the second operation mode and subsequently switches a state of the first processor from active to inactive, and
when an instruction to switch an operation mode is given by the input device after being switched to the second operation mode, the second processor changes the first processor from inactive to active, and the first processor performs control of switching from the second operation mode to the first operation mode.

6. The display control method according to claim 5, wherein the display displays image data generated by the first processor in a case of the first operation mode, and
the display displays image data being generated by the second processor and having a less color count or a less pixel count than image data generated by the first processor when the first operation mode is switched to the second operation mode.

7. The display control method according to claim 5, wherein the second processor executes reset control of a second display performing display with less power consumption than the display in a case of a third operation mode in which the first processor and the display are inactive.

8. The display control method according to claim 5, further comprising:
causing the display to perform color display.

9. A non-transitory computer readable recording medium recording a program readable by a computer in a display control device including a display, a first processor controlling the display, and a second processor controlling the display and having throughput less than the first processor, the program causing the computer to execute:
processing of causing the first processor to control reset of the display in a case of a first operation mode in which the first processor is active; and
processing of causing the second processor to control reset of the display (i) in a case of a second operation mode in which the first processor is inactive or (ii) in a case of detection of the first processor not operating normally,
wherein:
when an operation from an input device is not detected for a fixed time or more in the first operation mode, the first processor instructs the second processor to switch from the first operation mode to the second operation mode and subsequently switches a state of the first processor from active to inactive, and
when an instruction to switch an operation mode is given by the input device after being switched to the second operation mode, the second processor changes the first processor from inactive to active, and the first processor performs control of switching from the second operation mode to the first operation mode.

\* \* \* \* \*